US009929567B2

(12) United States Patent
Wang et al.

(10) Patent No.: US 9,929,567 B2
(45) Date of Patent: Mar. 27, 2018

(54) ZERO NET ENERGY DC DATACENTER POWER DISTRIBUTION ARCHITECTURE

(71) Applicant: ABB Schweiz AG, Baden (CH)

(72) Inventors: Zhenyuan Wang, Apex, NC (US); Sara Ahmed, Morrisville, NC (US); Juhua Liu, Cary, NC (US)

(73) Assignee: ABB Schweiz AG, Baden (CH)

( * ) Notice: Subject to any disclaimer, the term of this patent is extended or adjusted under 35 U.S.C. 154(b) by 204 days.

(21) Appl. No.: 14/836,189

(22) Filed: Aug. 26, 2015

(65) Prior Publication Data

US 2017/0063093 A1    Mar. 2, 2017

(51) Int. Cl.
*H02J 3/38*    (2006.01)
*H02M 7/04*    (2006.01)
*H02J 5/00*    (2016.01)
*H02J 1/10*    (2006.01)
*H02J 4/00*    (2006.01)

(52) U.S. Cl.
CPC .................. *H02J 5/00* (2013.01); *H02J 1/10* (2013.01); *H02J 3/38* (2013.01); *H02J 4/00* (2013.01)

(58) Field of Classification Search
USPC .................................... 307/64–65, 80, 84–85
See application file for complete search history.

(56) References Cited

U.S. PATENT DOCUMENTS

| 6,559,559 | B2 | 5/2003 | Cratty |
| 7,141,894 | B2 | 11/2006 | Kraus |
| 7,557,464 | B2 * | 7/2009 | Wang ...................... H02M 1/10 |
| | | | 307/65 |
| 7,560,831 | B2 | 7/2009 | Whitted et al. |
| 7,633,181 | B2 | 12/2009 | Gross et al. |
| 8,344,546 | B2 * | 1/2013 | Sarti ......................... G06F 1/30 |
| | | | 307/64 |
| 8,362,647 | B2 | 1/2013 | Anderson et al. |
| 8,937,405 | B2 | 1/2015 | Park |

(Continued)

FOREIGN PATENT DOCUMENTS

| WO | 2011081850 A1 | 7/2011 |
| WO | 2013130557 A1 | 9/2013 |

OTHER PUBLICATIONS

M. Arlitt, C. et al. "Towards the Design and Operation of Net-Zero Energy Data Centers", Hewlett-Packard Laboratories, 2012, 8 pgs., accessible at http://www.hpl.ph.com/discover2012/pdf/ITherm2012-2968_final_submit2.pdf.

*Primary Examiner* — An Luu
(74) *Attorney, Agent, or Firm* — Taft Stettinius & Hollister LLP (57) ABSTRACT

Unique systems, methods, techniques, and apparatuses of datacenter power supply systems are disclosed. One exemplary embodiment is a datacenter power supply system comprising an AC power bus structured to selectably receive AC power from an AC power grid and a AC generator and structured to provide AC power to one or more AC datacenter loads and an AC/DC converter, a DC power generation system structured to provide DC power to a DC/DC converter, a DC power bus structured to selectably receive power from the AC/DC converter and the DC/DC converter and to provide DC power to a plurality of DC datacenter loads, and an electronic control system structured to selectably control the datacenter power supply system to operate in plurality of modes.

19 Claims, 3 Drawing Sheets

(56) References Cited

U.S. PATENT DOCUMENTS

| | | | |
|---|---|---|---|
| 8,970,176 B2 * | 3/2015 | Ballatine | H02J 1/102 307/11 |
| 9,218,035 B2 * | 12/2015 | Li | G06F 1/263 |
| 2011/0148194 A1 | 6/2011 | Lai et al. | |
| 2011/0156480 A1 | 6/2011 | Park | |
| 2012/0025616 A1 | 2/2012 | Hock | |
| 2013/0212410 A1 | 8/2013 | Li et al. | |
| 2013/0253716 A1 | 9/2013 | Gross et al. | |
| 2014/0309802 A1 | 10/2014 | Monahan | |

* cited by examiner

ZERO NET ENERGY DC DATACENTER POWER DISTRIBUTION ARCHITECTURE

BACKGROUND

The present application relates generally to a power distribution system and more particularly, but not exclusively to a zero net energy (ZNE) DC datacenter power distribution system. Recent developments in renewable energy technology and DC grid technology have facilitated development of ZNE power distribution systems. Present efforts in ZNE power distribution systems suffer from a number of shortcomings and disadvantages. Existing proposals fail to effectively power a datacenter by regulating the power generated by multiple power sources in order to reduce power consumption from a utility grid and reduce the energy cost of the power distribution system. There remain unmet needs respecting power supply regulation, reliability, and power quality. Further unmet needs include reducing energy costs and preventing loss of power to a datacenter. There is a significant need for the unique apparatuses, methods, systems and techniques disclosed herein.

DISCLOSURE

For the purposes of clearly, concisely and exactly describing exemplary embodiments of the invention, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art.

SUMMARY

One embodiment is a unique datacenter power supply system. Further embodiments, forms, objects, features, advantages, aspects, and benefits shall become apparent from the following description and drawings.

DETAILED DESCRIPTION OF ILLUSTRATIVE EMBODIMENTS

Figure 1:
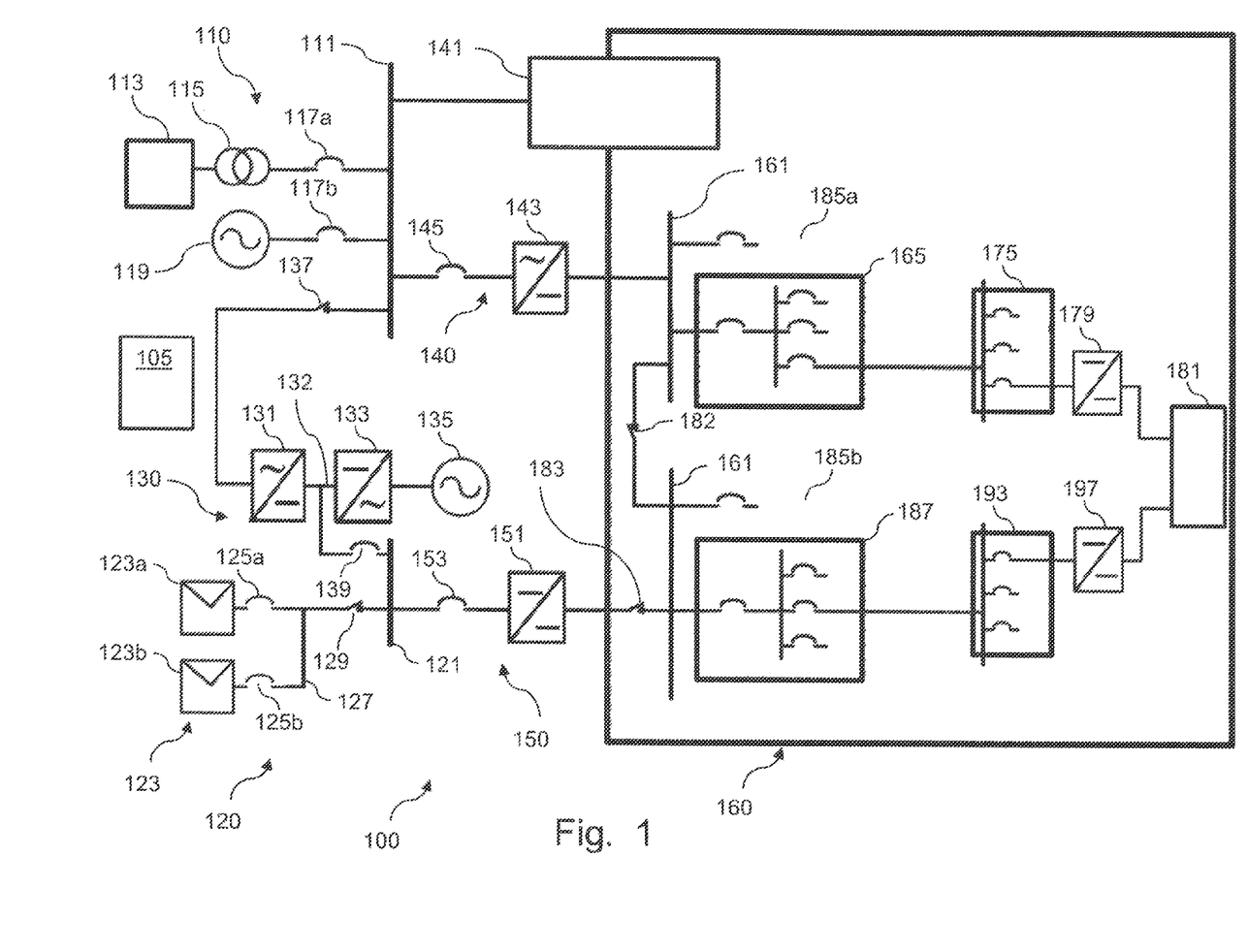
FIG. 1 illustrates an exemplary datacenter power supply system.

With reference to FIG. 1 there is illustrated an exemplary datacenter power supply system 100. System 100 includes AC power system 110 coupled to an AC power bus 111. AC power system 110 includes power grid 113, transformer 115, and circuit breaker 117a. Power grid 113 is operatively coupled to AC power bus 111 by way of power transformer 115 and circuit breaker 117a. Grid 113 is structured to selectably transfer power to bus 111 and to selectably receive power from bus 111. In certain embodiments, grid 113 is a utility grid. In the illustrated embodiment, transformer 115 is a step down transformer. In certain embodiments, transformer 115 is a step up transformer. In still another embodiment, transformer 115 is not present.

Breaker 117a is structured to disrupt the flow of current between grid 113 and AC power bus 111. Breaker 117a may be a mechanical circuit breaker, solid state circuit breaker, switch, semiconductor device, contactor, or any other device structured to disrupt the flow of electrical current. It shall be appreciated that any or all of the foregoing features and alternative embodiments related to breaker 117a may also apply to other circuit breakers and switches disclosed herein.

AC power system 110 further includes AC generator 119 coupled to AC power bus 111 by way of circuit breaker 117b. Generator 119 is structured to selectably provide power to bus 111. In certain embodiments, generator 119 is a natural gas generator. Generator 119 may be a diesel generator, gasoline generator, propane generator, biofuel generator, wind turbine, hydroelectric turbine, or any other apparatus, machine, or system structured to generate AC power. In yet another embodiment, there could be a transformer between generator 119 and bus 111.

System 100 includes DC power generation system 120 coupled to DC power bus 121. DC power generation system includes DC power source 123. In the illustrated embodiment, DC power source 123 comprises a plurality of photovoltaic generation units 123a, 123b. The photovoltaic generation units 123a, 123b are coupled with photovoltaic bus 127 by way of circuit breakers 125a, 125b, respectively. In the illustrated embodiment each photovoltaic cell 123a, 123b includes an internal DC/DC converter which performs a maximum power point tracking function in order to generate an output voltage of approximately 700V, it being understood that other photovoltaic cell configurations and voltages may be utilized in other embodiments. The photovoltaic bus 127 is connected to DC power bus 121 by way of switch 129 which is structured to selectably disrupt the flow of current from the photovoltaic generation units 123 to DC power bus 121.

In certain embodiments, DC power source 123 comprises a plurality of fuel cells. DC power source 123 may also comprise one or more photovoltaic generation units, fuel cells, another type of DC power source or a combination thereof.

System 100 includes energy storage system 130. System 130 is coupled to AC power bus 111 and DC power bus 121. System 130 includes energy storage device 135 structured to selectably store and discharge energy. In the illustrated embodiment, energy storage device 135 comprises an electric machine coupled with a flywheel. Energy storage device 135 is coupled to converter 133 which is structured to receive DC power, convert the DC power to AC power, and provide AC power to the machine to drive the flywheel, as well as to receive AC power from the machine driven by the flywheel, and convert AC power to DC power. In other embodiments, energy storage device 135 may comprise one or more batteries and/or supercapacitors and converter 133 may be a DC/DC converter structured to receive DC power, step up or step down the voltage of the DC power, and output DC power.

Converter 133 is coupled to converter 131 by way of DC link 132. DC link 132 is structured to transfer DC power between converter 131, converter 133, and DC power bus 121. DC power bus 121 is selectably coupled to DC link 132 by way of circuit breaker 139. Converter 131 is coupled to AC power bus 111 by way of switch 137 and is structured to receive power from AC power bus 111, convert the AC power to DC power, and provide DC power to DC link 132, as well as to receive DC power from DC link 132, convert DC power to AC power, and to provide power to AC power bus 111.

System 100 includes AC distribution path 140. Path 140 includes AC datacenter loads 141 coupled to AC power bus 111 and structured to receive power from AC power bus 111. In the illustrated embodiment, AC datacenter loads 141 include a cooling system and other auxiliary loads. AC datacenter loads 141 may also include a variety of other AC datacenter loads.

Path 140 also includes AC/DC converter 143 coupled to AC power bus 111 by way of circuit breaker 145. AC/DC converter 143 is structured to receive AC power from AC power bus 111 and convert the AC power to DC power, for example, 380V DC power in certain embodiments. Converter 143 may be structured to receive DC power, convert the DC power to AC power, and provide AC power to AC power bus 111.

System 100 includes DC distribution path 150 which is coupled to DC power bus 121. Path 150 includes DC/DC converter 151 coupled to DC power bus 121 by way of circuit breaker 153. In the illustrated embodiment, DC/DC converter 151 is structured to receive 700V DC power from DC power bus 121 and step down the DC voltage to 380V DC power, it being appreciated that other step down and step up voltages are also contemplated. DC/DC converter 151 is preferably bidirectional and may be selectably operated to receive DC power from DC power bus 121, step up or step down the received voltage, and provide DC power to DC power bus 161 as well as receive DC power from DC power bus 161, step up or step down the received voltage, and provide DC power to DC power bus 121. It shall be appreciated that any or all of the foregoing aspects and features related to DC/DC converter 151 may be present in other DC/DC converters disclosed herein.

System 100 includes DC power distribution system 160 which is coupled to DC power distribution path 150 and AC power distribution path 140. System 160 is structured to receive DC power from AC/DC converter 143 and DC/DC converter 151. System 160 may be structured to receive power from one of AC/DC converter 143 and DC/DC converter 151, and to provide power to the other of AC/DC converter 143 and DC/DC converter 151. In the illustrated embodiment, distribution system 160 includes two redundant pathways structured to power a plurality of DC datacenter loads, including one or more DC datacenter loads 181. Each of the redundant pathways is structured to provide full or a fractional power input to the plurality of DC datacenter loads.

System 160 includes DC bus 161, DC power distribution units 165 and 187, remote power panels 175 and 193, power supply units 179 and 197, and DC datacenter loads 181. In the illustrated embodiment, PSU 179 is a DC/DC converter. In certain embodiments, PSU 179 includes one or more circuit breakers. DC bus 161 is coupled to AC/DC converter 143 and coupled to DC/DC converter 151 by way of switch 183. DC bus 161 includes bus tie switch 182 structured to selectably disconnect one half of DC bus 161 from the other half DC bus 161 is coupled to distribution line 162 and power distribution unit (PDU) 165. Circuit breaker 163 is coupled to line 162 which is also coupled to another DC datacenter load (not illustrated). It shall be appreciated that DC bus 161 may further coupled to additional distribution lines and power distribution units which denoted generally by ellipsis 185a and ellipsis 185b.

PDU 165 includes an input distribution line coupled with a power distribution bus by way of a circuit breaker. PDU 165 further includes a plurality of distribution feeders coupled with the power distribution bus by way of respective circuit breakers. The distribution feeders are further coupled to multiple loads of system 160 including remote power panel (RPP) 175 and various other loads which are not illustrated. RPP 175 includes an RPP bus which is coupled with a plurality of distribution feeders. The distribution feeders are coupled with loads such as PSU 179 via circuit breakers and ultimately to loads, such as loads 181 which may comprise one or more DC load of a datacenter such as one or more server. It shall be appreciated that a variety of other configurations and interconnections of PDU 165 and RPP 175 are contemplated.

PDU 187 includes an input distribution line coupled with a power distribution bus by way of a circuit breaker. PDU 187 further includes a plurality of distribution feeders coupled with the power distribution bus by way of respective circuit breakers. The distribution feeders are further coupled to multiple loads of system 160 including remote power panel (RPP) 193 and various other loads which are not illustrated. RPP 193 includes an RPP bus which is coupled with a plurality of distribution feeders. The distribution feeders are coupled with loads such as PSU 197 via circuit breakers and ultimately to loads, such as loads 181. It shall be appreciated that a variety of other configurations and interconnections of PDU 187 and RPP 197 are contemplated.

System 100 includes electronic control system 105 which is structured to control various circuit breakers, switches, converters, and devices of system 100 including, for example, those illustrated in connection with FIG. 1 and described above. In certain embodiments, control system 105 comprises a plurality of control units incorporated into one or more of the circuit breakers, switches, converters and/or devices of system 100. In other embodiments, control system 105 comprises a central controller device in communication with the circuit breakers, switches, AC generator and converters of system 100, for example, via a network, relays or combinations thereof.

Control system 105 is structured to regulate the power delivered to the plurality of DC datacenter loads by controlling the circuit breakers, switches, converters, and AC generator of system 100. Control system 105 is structured to selectably control the datacenter power supply system 100 to operate in a plurality of modes. In a first mode, AC datacenter loads 141 are powered by one of the AC power grid 113 and the AC generator 119, and loads of DC distribution system 160, such as DC datacenter loads 181, are powered by the DC power generation system 120. In a second mode, AC datacenter loads 141 and the plurality of DC datacenter loads 181 are powered by one of the AC power grid 113 and the AC generator 119. In a third mode one or more AC datacenter loads 141 and the plurality of DC datacenter load 181 are powered by the DC power generation system 120.

In certain forms of the first mode, control system 105 activates AC generator 119, opens circuit breakers 117a, 145, and 139, and opens switch 137 in order to power the DC datacenter loads 181 using DC power generation system 120 and to power AC datacenter loads 141 using AC generator 119. In certain forms of the first mode, control system 105 closes circuit breaker 117a, opens circuit breakers 117b, 145, and 139; and opens switch 137 in order to power the DC datacenter loads 181 using DC power generation system 120 and to power AC datacenter loads 141 using grid 113.

In certain forms of the second mode, control system 105 opens switches 183, and 137 well as circuit breaker 117b in order to power the plurality of DC datacenter loads 181 and AC datacenter loads 141 using one of grid 113 and AC generator 119. In certain forms of the third mode, control system 105 opens circuit breakers 117a and 117b in order to power AC datacenter loads 141 and DC datacenter loads 181 using DC power generation system 120.

Control system 105 is structured to control the datacenter power supply system 100 to selectably supply power from AC power bus 111 or DC power generation system 120 to the energy storage device 135 and to supply power from the energy storage device 135 to the AC power bus 111, DC power bus 121, or photovoltaic bus 127.

Control system 105 is structured to route power from the energy storage device 135 to one of the photovoltaic bus 127, DC power bus 121, and the AC power bus 111, for example, during a transition from one of the first mode, the second mode and the third mode to another of the first mode, the second mode and the third mode as well as at other times. By controlling system 100 to draw stored power from energy storage device 135, control system 105 can mitigate power disruptions such as voltage or current sags or spikes and other transients. Control system 105 is further structured to route power to the energy storage device 135 from one or more of the photovoltaic bus 127, DC power bus 121, and the AC power bus 111 in order to provide a desired amount of energy storage.

In certain control modes, control system 105 is structured to regulate the voltage across DC bus 121 by monitoring output voltage from DC power generation system 120 and providing power from energy storage device 135 to DC bus 121 in response to a decrease in output voltage from DC power generation system 120 or other drop in voltage of the DC bus 121. In certain control modes, control system 105 is structured to regulate the voltage across AC power bus 111 by monitoring output voltage from AC power system 110 and providing power from energy storage device 135 to AC power bus 111 in response to a decrease in output voltage from AC power system 110, or other drop in voltage of the DC bus.

In certain control modes, control system 105 is structured to regulate current frequency across AC power bus 111 by transferring power with a desired current frequency from energy storage device 135 to AC power bus 111 by way of converter 133, DC link 132, and converter 131.

In certain control modes, control system 105 is structured to transfer excess power generated by DC power generation system 120 to power grid 113 in order to sell excess power. In another embodiment, control system 105 is structured to transfer excess power generated by AC generator 119 to power grid 113 when the cost of power produced by AC generator 119 is lower than the compensation received from transferring power to power grid 113. In certain control modes, the power received from power grid 113 does not exceed the power provided to power grid 113 from one of AC generator 119 and DC power generation system 120.

Figure 2:
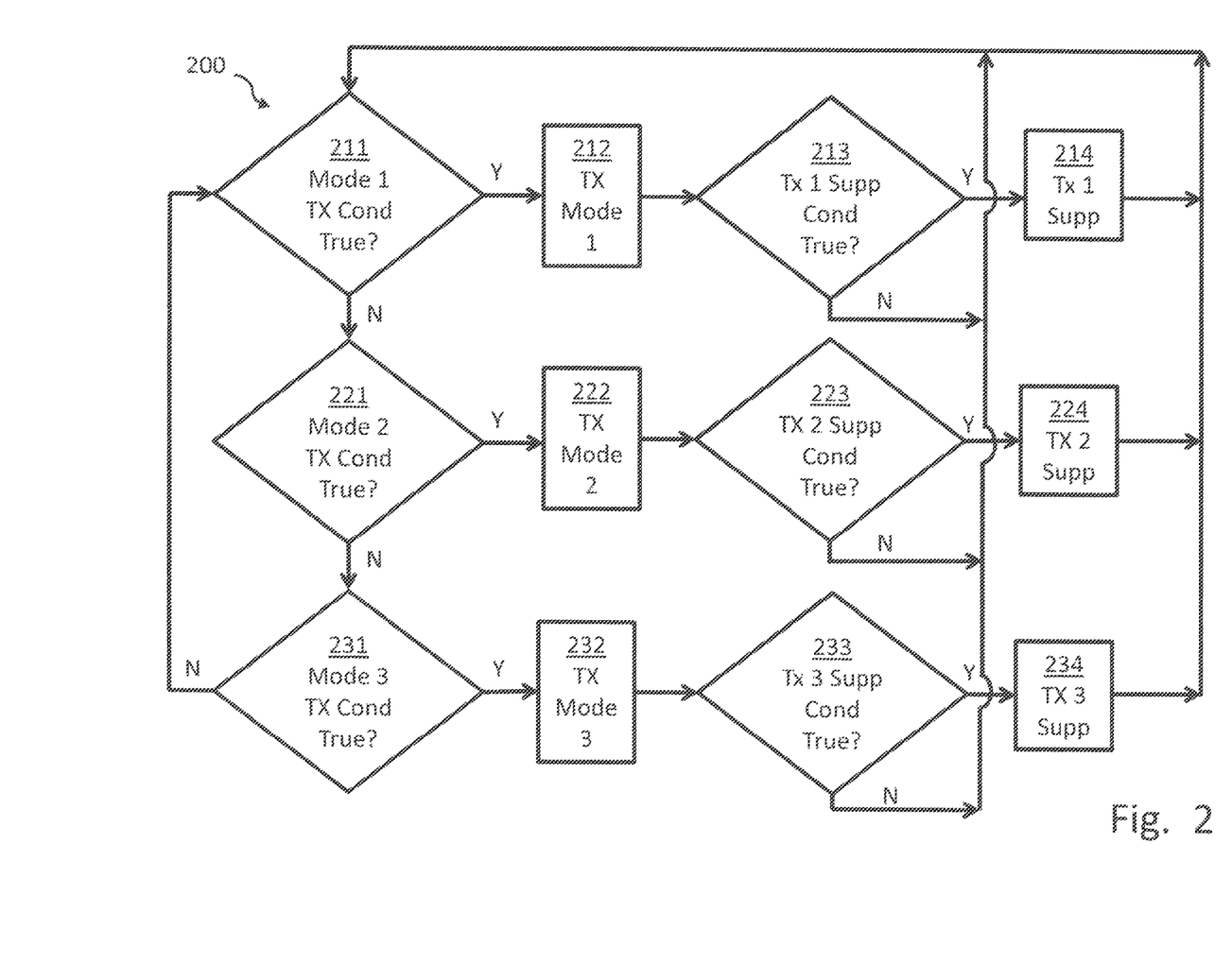
FIG. 2 illustrates an exemplary control process for a data center power supply system.

With reference to FIG. 2 there is illustrated an exemplary control process 200 for controlling a datacenter power supply system such as system 100 described above in connection with FIG. 1. Process 200 begins at start operation 201 which may be executed when a datacenter power system is brought on line or at different points during on line operation of a datacenter power system. From operation 201, process 200 proceeds to conditional 211 which evaluates whether a condition for transitioning to a first datacenter operating mode is true. The first datacenter operating mode may be, for example, the first mode described in connection with system 100 in which the AC datacenter loads are powered by AC power system 110 and the loads of DC distribution system 160 are powered by the DC power system 120. The conditions for entering into the first mode may be based upon the power capacity available from AC power system 110 and DC power system 120, the cost of power from systems 110 and 120, the power demand of DC power distribution system 160, and operator commands among other criteria.

If conditional 211 is not true, process 200 proceeds to conditional 221 which evaluates whether a condition for transitioning to a second datacenter operating mode is true. The second datacenter operating mode may be, for example, the second mode described in connection with system 100 in which the AC datacenter loads and the loads of DC distribution system 160 are powered by AC power system 110. The conditions for entering into the second mode may be based upon the power capacity available from AC power system 110 and DC power system 120, the cost of power from systems 110 and 120, the power demand of DC power distribution system 160, and operator commands among other criteria.

If conditional 221 is not true, process 200 proceeds to conditional 231 which evaluates whether a condition for transitioning to a third datacenter operating mode is true. The third datacenter operating mode may be, for example, the third mode described in connection with system 100 in which the AC datacenter loads and the loads of DC distribution system 160 are powered by the DC power system 120. The conditions for entering into the third mode may be based upon the power capacity available from AC power system 110 and DC power system 120, the cost of power from systems 110 and 120, the power demand of DC power distribution system 160, and operator commands among other criteria.

If conditional 231 is not true, process 200 proceeds to conditional 211. Conditionals 211, 221, and 231 may run as a control loop for a predetermined or indefinite period of time and may run continuously or may be called to run when requested by other control system elements. Conditionals 211, 221 and 231 may be structured to account for the current state of system operation, and to evaluate as not true for the current system operating mode (e.g., conditional 211 may evaluate not true whenever the system is already operating in the first mode). Alternatively, conditionals 211, 223, and 231 may perform their evaluations without regard to the current system operating mode and the current mode may be accounted for in subsequent operations.

If conditional 211 is true, process 200 proceeds to operation 212 which initiates a transition of the system to the first operating mode. In certain forms, operation 212 may consider whether the system is already operating in the first mode and, if so, simply maintain that mode without initiating any transition. From operation 212, process 200 proceeds to conditional 213 which evaluates whether one or more conditions for operating the energy storage system 130 to supply power to or receive power from AC power system 110 and/or the DC power system 120 are true. The conditions for operating energy storage system 130 may include the voltage or power levels of AC power system 110 and/or DC power system 120 and the energy storage capacity of energy storage system 130.

If conditional 213 is not true, process 200 proceeds to operation 211. If conditional 213 is true process 200 proceeds to operation 214 which initiates an operation of the energy storage system 130 which may involve providing supplemental power to AC power system 110 and/or DC power system 120 or providing power to energy storage system 130 from AC power system 110 and/or DC power system 120. From operation 214, process 200 proceeds to conditional 211.

If conditional 221 is true, process 200 proceeds to operation 222 which initiates a transition of the system to the second operating mode. In certain forms, operation 222 may consider whether the system is already operating in the second mode and, if so, simply maintain that mode without initiating any transition. From operation 222, process 200 proceeds to conditional 223 which evaluates whether one or more conditions for operating the energy storage system 130 to supply power to or receive power from AC power system 110 and/or the DC power system 120 are true. The conditions for operating energy storage system 130 may include the voltage or power levels of AC power system 110 and/or DC power system 120 and the energy storage capacity of energy storage system 130.

If conditional 223 is not true, process 200 proceeds to conditional 211. If conditional 223 is true process 200 proceeds to operation 224 which initiates an operation of the energy storage system 130 which may involve providing supplemental power to AC power system 110 and/or DC power system 120 or providing power to energy storage system 130 from AC power system 110 and/or DC power system 120. From operation 224, process 200 proceeds to conditional 211.

If conditional 231 is true, process 200 proceeds to operation 232 which initiates a transition of the system to the third operating mode. In certain forms, operation 232 may consider whether the system is already operating in the third mode and, if so, simply maintain that mode without initiating any transition. From operation 232, process 200 proceeds to conditional 233 which evaluates whether one or more conditions for operating the energy storage system 130 to supply power to or receive power from AC power system 110 and/or the DC power system 120 are true. The conditions for operating energy storage system 130 may include the voltage or power levels of AC power system 110 and/or DC power system 120 and the energy storage capacity of energy storage system 130.

If conditional 233 is not true, process 200 proceeds to conditional 211. If conditional 233 is true process 200 proceeds to operation 234 which initiates an operation of the energy storage system 130 which may involve providing supplemental power to AC power system 110 and/or DC power system 120 or providing power to energy storage system 130 from AC power system 110 and/or DC power system 120. From operation 234, process 200 proceeds to conditional 211.

In certain embodiments the conditions for entering the first mode, second mode and third mode may be selected to minimize consumption by the system of power from the utility grid while also providing substantially uninterrupted power to the one or more AC loads and the plurality of DC loads. Is certain forms and operating conditions these criteria may be utilized by control process to provide energy consumption approaching, achieving or surpassing net zero energy (NZE) consumption from the utility grid. NZE consumption may be realized in part by controls which provide energy back to the utility grid to offset or surpass any power which is consumed from the grid.

While controls process 200 has been described with reference certain aspects of system 100, it shall be appreciated that process 200 may also be applied to a variety of additional datacenter power supply systems including, for example, system 300 described below in connection with FIG. 3. It shall be further appreciated that the operations and conditionals of process 200 may be augmented, changed or eliminated to account for variations in system operation. For example, certain embodiments which omit energy storage system 130 conditionals 213, 223, and 224 and operations 214, 224 and 225 may be omitted. Additionally, embodiments which contemplate provision of energy from DC power system 120 or generator 119 may further include control conditionals and operations to effect such power supply when power availability and relative cost conditions are met. In further embodiments, the controls may select optimal power routing, for example, via energy storage system 130 or through DC bus 120 depending on the particular loads to be powered and the relative efficiencies of the power routings.

Figure 3:
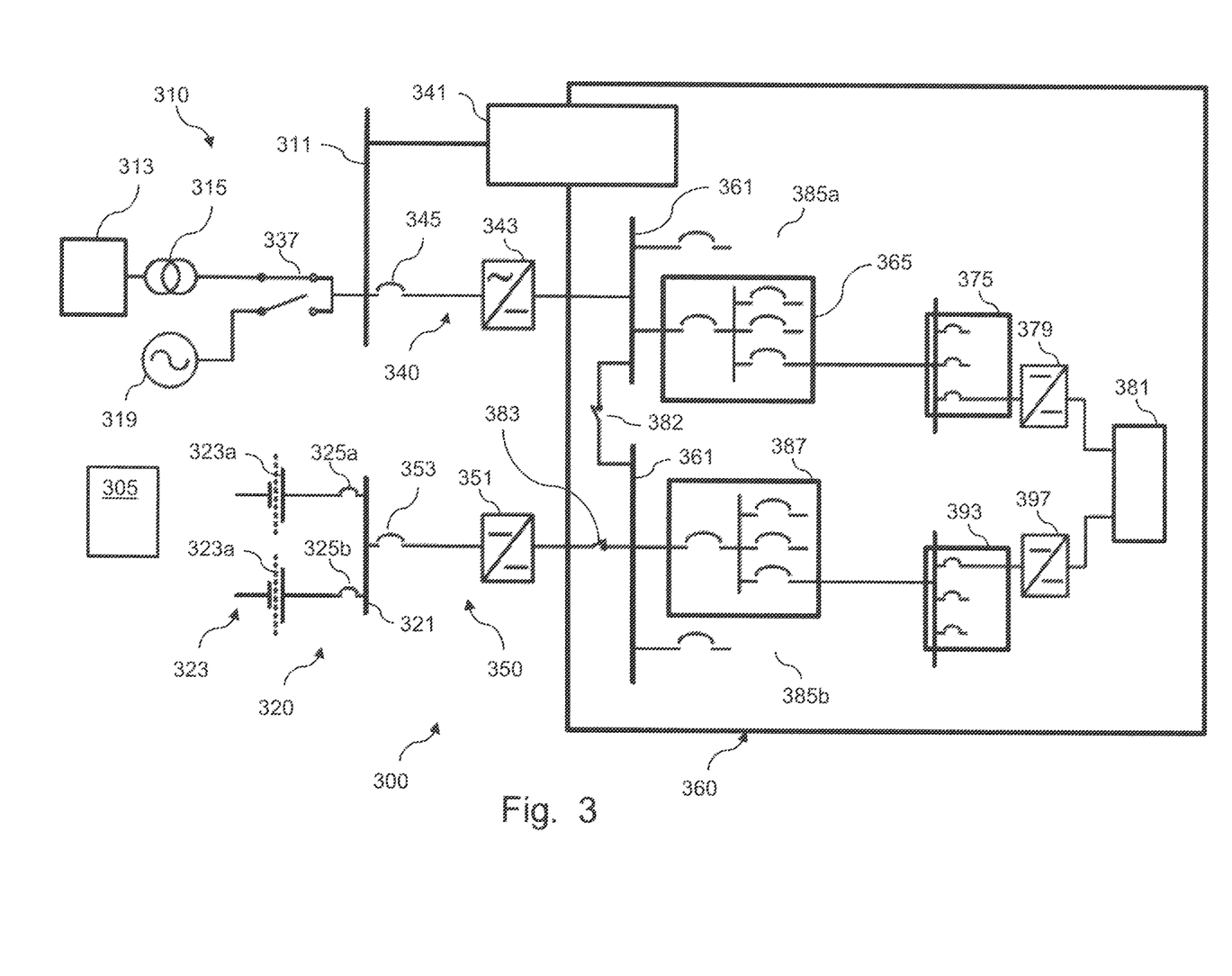
FIG. 3 illustrates an exemplary datacenter power supply system.

With reference to FIG. 3 there is illustrated an exemplary datacenter power supply system 300. System 300 includes AC power system 310 coupled to an AC power bus 311. AC power system 310 includes power grid 313, transformer 315, and circuit breaker 317a. Power grid 313 is operatively coupled to AC power bus 311 by way of power transformer 315 and switch 337 which is illustrated as a double pole double throw switch (also called an automatic transfer switch) but may be provided in a variety of other forms. Grid 313 is structured to selectably transfer power to bus 311 and to selectably receive power from bus 311. In certain embodiments, grid 313 is a utility grid. Grid 313 may also be an electrical grid for a marine vessel, land vehicle, aerospace vehicle, construction equipment, mining equipment, factory, manufacturing facilities, or industrial facility. In the illustrated embodiment, transformer 315 is a step down transformer. In certain embodiments, transformer 315 is a step up transformer. In still another embodiment, transformer 315 is not needed.

AC power system 310 further includes AC generator 319 coupled to AC power bus 311 by way of switch 337. Generator 319 is structured to selectably provide power to bus 311. In certain embodiments, generator 319 is a natural gas generator. Generator 319 may be a diesel generator, gasoline generator, propane generator, biofuel generator, wind turbine, hydroelectric turbine, or any other apparatus, machine, or system structured to generate AC power.

System 300 includes DC power generation system 320 coupled to DC power bus 321. DC power generation system includes DC power source 323. In the illustrated embodiment, DC power source 323 comprises a plurality of fuel cells 323a, 323b. The fuel cells 323a, 323b are coupled with DC power bus 321 by way of circuit breakers 325a and 325b, respectively. It shall be appreciated that power source 323 may be provided in a variety of other forms, for example, DC power source 323 may be one or more photovoltaic generation units, fuel cells, another type of DC power source or a combination thereof. In certain embodiments, circuit breakers 325a and 325b may provide a switching functionality.

System 300 includes AC distribution path 340. Path 340 includes AC datacenter loads 341 coupled to AC power bus 311 and structured to receive power from AC power bus 311. In the illustrated embodiment, AC datacenter loads 341 include a cooling system and other auxiliary loads. AC datacenter loads 341 may also include a variety of other AC datacenter loads.

Path 340 also includes AC/DC converter 343 coupled to AC power bus 311 by way of circuit breaker 345. AC/DC converter 343 is structured to receive AC power from AC power bus 311 and convert the AC power to DC power, for example, 380V DC power in certain embodiments. Converter 343 may be structured to receive DC power, convert the DC power to AC power, and provide AC power to AC power bus 311.

System 300 includes DC distribution path 350 which is coupled to DC power bus 321. Path 350 includes DC/DC converter 351 coupled to DC power bus 321 by way of circuit breaker 353. In the illustrated embodiment, DC/DC converter 351 is structured to receive 700V DC power from DC power bus 321 and step down the DC voltage to 380V DC power, it being appreciated that other step down and step up voltages are also contemplated. DC/DC converter 351 is preferably bidirectional and may be selectably operated to receive DC power from DC power bus 321, step up or step down the received voltage, and provide DC power to DC power bus 361 as well as receive DC power from DC power bus 361, step up or step down the received voltage, and provide DC power to DC power bus 321. It shall be appreciated that any or all of the foregoing aspects and features related to DC/DC converter 351 may be present in other DC/DC converters disclosed herein.

System 300 includes DC power distribution system 360 which is coupled to DC power distribution path 350 and AC power distribution path 340. System 360 is structured to receive DC power from AC/DC converter 343 and DC/DC converter 351. System 360 may be structured to receive power from one of AC/DC converter 343 and DC/DC converter 351, and to provide power to the other of AC/DC converter 343 and DC/DC converter 351. In the illustrated embodiment, distribution system 360 includes two redundant pathways structured to power a plurality of DC datacenter loads, including DC datacenter loads 381. Each of the redundant pathways is structured to provide full or a fractional power input to the plurality of DC datacenter loads.

System 360 includes DC bus 361, DC power distribution units 365 and 387, remote power panels 375 and 393, power supply units 379 and 399, and DC datacenter loads 381. In the illustrated embodiment, PSU 379 is a DC/DC converter. In certain embodiments, PSU 379 includes one or more circuit breakers. DC bus 361 is coupled to AC/DC converter 343 and coupled to DC/DC converter 351 by way of switch 383. DC bus 361 includes bus tie switch 382 structured to selectably disconnect one half of DC bus 361 from the other half DC bus 361 is coupled to distribution line 362 and power distribution unit (PDU) 365. Circuit breaker 363 is coupled to line 362 which is also coupled to a DC datacenter load (not illustrated). It shall be appreciated that DC bus 361 may further coupled to additional distribution lines and power distribution units which denoted generally by ellipsis 385a and ellipsis 385b.

PDU 365 includes an input distribution line coupled with a power distribution bus by way of a circuit breaker. PDU 365 further includes a plurality of distribution feeders coupled with the power distribution bus by way of respective circuit breakers. The distribution feeders are further coupled to multiple loads of system 360 including remote power panel (RPP) 375 and various other loads which are not illustrated. RPP 375 includes an RPP bus which is coupled with a plurality of distribution feeders. The distribution feeders are coupled with loads such as PSU 379 via circuit breakers and ultimately to loads, such as loads 381 which may comprise one or more DC loads of a datacenter such as one or more servers. It shall be appreciated that a variety of other configurations and interconnections of PDU 365 and RPP 375 are contemplated.

PDU 387 includes an input distribution line coupled with a power distribution bus by way of a circuit breaker. PDU 387 further includes a plurality of distribution feeders coupled with the power distribution bus by way of respective circuit breakers. The distribution feeders are further coupled to multiple loads of system 360 including remote power panel (RPP) 393 and various other loads which are not illustrated. RPP 393 includes an RPP bus which is coupled with a plurality of distribution feeders. The distribution feeders are coupled with loads such as PSU 397 via circuit breakers and ultimately to loads, such as loads 381 which may be a DC load of a datacenter such as a server. It shall be appreciated that a variety of other configurations and interconnections of PDU 387 and RPP 397 are contemplated.

System 300 includes electronic control system 305 which is structured to control various circuit breakers, switches, converters, and devices of system 300 including, for example, those illustrated in connection with FIG. 3 and described above. In certain embodiments, control system 305 comprises a plurality of control units incorporated into one or more of the circuit breakers, switches, converters and/or devices of system 300. In other embodiments, control system 305 comprises a central controller device in communication with the circuit breakers, switches, AC generator and converters of system 300, for example, via a network, relays or combinations thereof.

Control system 305 is structured to regulate the power delivered to the plurality of DC datacenter loads by controlling the circuit breakers, switches, converters, and AC generator of system 300. Control system 305 is structured to selectably control the datacenter power supply system 300 to operate in a plurality of modes. In a first mode, AC datacenter loads 341 are powered by one of the AC power grid 313 and the AC generator 319, and loads of DC distribution system 360, such as DC datacenter loads 381, are powered by the DC power generation system 320. In a second mode AC datacenter loads 341 and the plurality of DC datacenter loads 381 are powered by one of the AC power grid 313 and the AC generator 319. In a third mode one or more AC datacenter loads 341 and the plurality of DC datacenter loads 381 are powered by the DC power generation system 320.

In certain forms of the first mode, control system 305 activates AC generator 319 and controls switch 337 to connect AC bus 311 with AC generator 319, and opens breaker 345 in order to power the DC datacenter loads 381 using DC power generation system 320 and to power AC datacenter loads 341 using AC generator 319. In certain forms of the first mode, control system 305 activates AC generator 319 and controls switch 337 to connect AC bus 311 with grid 313, and opens breaker 345 in order to power the DC datacenter loads 381 using DC power generation system 320 and to power AC datacenter loads 341 using grid 313.

In certain forms of the second mode, control system 305 controls switch 337 and circuit breaker 345 to power the plurality of DC datacenter loads and AC datacenter loads 341 using one of grid 313 and AC generator 319. In certain embodiments of the third mode, control system 305 controls switch 37 and breaker 345 to power AC datacenter loads 341 and DC datacenter loads 381 using DC power generation system 320.

Control system 305 is structured to control the datacenter power supply system 300 to selectably supply power from AC power bus 311 or DC power generation system 320 to the energy storage device 335 and to supply power from the energy storage device 335 to the AC power bus 311, or DC power bus 321.

In certain control modes, control system 305 is structured to regulate the voltage across DC bus 321 by monitoring output voltage from DC power generation system 320 and providing power from energy storage device 335 to DC bus 321 in response to a decrease in output voltage from DC power generation system 320. In certain control modes, control system 305 is structured to regulate the voltage across AC power bus 311 by monitoring output voltage from AC power system 310 and providing power from energy storage device 335 to AC power bus 311 in response to a decrease in output voltage from AC power system 310.

In certain control modes, control system 305 is structured to regulate current frequency across AC power bus 311 by transferring power with a desired current frequency from energy storage device 335 to AC power bus 311 by way of converter 333, DC link 332, and converter 331.

In certain control modes, control system 305 is structured to transfer excess power generated by DC power generation system 320 to power grid 313 in order to sell excess power. In another embodiment, control system 305 is structured to transfer excess power generated by AC generator 319 to power grid 313 when the cost of power produced by AC generator 319 is lower than the compensation received from transferring power to power grid 313. In certain control modes, the power received from power grid 313 does not exceed the power provided to power grid 313 from one of AC generator 319 and DC power generation system 320.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A datacenter power supply system comprising:
   an AC power bus structured to selectably receive AC power from an AC power grid and a AC generator and structured to provide AC power to one or more AC datacenter loads and an AC/DC converter;
   a DC power generation system structured to provide DC power to a DC/DC converter;
   a DC power bus structured to selectably receive power from the AC/DC converter and the DC/DC converter and to provide DC power to a plurality of DC datacenter loads; and
   an electronic control system structured to selectably control the datacenter power supply system to operate in plurality of modes including a first mode in which the one or more AC datacenter loads are powered by one of the AC power grid and the AC generator and the plurality of DC datacenter loads are powered by the DC power generation system, a second mode in which the one or more AC datacenter loads and the plurality of DC datacenter loads are powered by one of the AC power grid and the AC generator, and a third mode in which the one or more AC datacenter loads and the plurality of DC datacenter loads are powered by the DC power generation system.

2. The datacenter power supply system of claim 1 wherein the DC power generation system comprises:
   a plurality of photovoltaic generation units;
   a photovoltaic bus operatively coupled with the plurality of photovoltaic generation units and the DC/DC converter; and
   a second converter including a DC link operatively coupled with the photovoltaic bus, a first output operatively coupled with the AC power bus, and a second output operatively coupled with an energy storage device.

3. The datacenter power supply system of claim 2 wherein the energy storage device comprises one of an electric machine coupled with a flywheel, a battery, and a supercapacitor.

4. The datacenter power supply system of claim 2 wherein the electronic control system is structured to control the datacenter power supply system to selectably supply power from the AC bus or the DC power generation system to the energy storage device or to selectably supply power from the energy storage device to the AC bus or the photovoltaic bus.

5. The datacenter power supply system of claim 2 wherein the electronic control system is structured to route power from the energy storage device to one of the photovoltaic bus and the AC bus during a transition from at least one of the first mode, the second mode and the third mode to another of the first mode, the second mode and the third mode.

6. The datacenter power supply system of claim 1 wherein the DC power generation system comprises a plurality of fuel cells structured to output DC power to the DC/DC converter.

7. The datacenter power supply system of claim 6 wherein the electronic control system is structured to control the datacenter power supply system to selectably supply power from the plurality of fuel cells to one of the DC power bus alone and a combination of the DC power bus and the AC power bus.

8. The datacenter power supply system of claim 1 wherein the DC power generation system comprises:
   a DC power source;
   a second DC power bus operatively coupled with the DC power source and the DC/DC converter; and
   a second converter operatively coupled with the second DC power bus and including a first output operatively coupled with the AC power bus, and a second output operatively coupled with an energy storage device.

9. The datacenter power supply system of claim 8 wherein the energy storage device comprises one of an electric machine coupled with a flywheel, a battery and a supercapacitor and the DC power source comprises one of plurality of photovoltaic generation units and a plurality of fuel cells.

10. A power supply system comprising:
   an AC power bus coupled to a utility grid;
   a DC power bus coupled to a DC power source;
   a DC power distribution subsystem coupled to the AC power bus and the DC power bus and structured to supply DC power to a plurality of loads;
   a power converter coupled to the AC power bus and the DC power bus and structured to selectably receive power from the AC power bus, supply power to the AC power bus, receive power from the DC power bus, and supply power to the DC power bus;

an energy storage device coupled to the power converter; and an electronic control system structured to control the transfer of power between the energy storage device, the AC power bus, and the DC power bus, wherein the electronic control system is structured to transfer power generated by the DC power source to the utility grid by way of the DC power bus, the power converter, and the AC power bus.

11. The system of claim 10 further comprising an electrical generator coupled to the AC power bus.

12. The system of claim 10 wherein the energy storage device comprises at least one of a rotary device structured to store rotational kinetic energy, an ultracapacitor, and a battery bank.

13. The system of claim 10 wherein the electronic control system is structured to transfer power from the energy storage device to the DC power bus in response to a drop in voltage across the DC power bus and to transfer power from the energy storage device to the AC power bus in response to a change in current frequency.

14. The system of claim 10 wherein the DC power distribution subsystem is structured to provide DC power to a plurality of computers in a datacenter and is coupled to the AC power bus by way of a rectifier.

15. A method comprising:

operating a datacenter power supply system including an AC power bus coupled to a utility grid, one or more AC loads coupled with the AC power bus, a DC power bus coupled to a dedicated DC power source, a DC power distribution system structured to supply DC power to a plurality of DC loads, the DC power distribution system coupled to the DC power bus and coupled to the AC power bus by an AC/DC converter, and a controller in operative communication with a plurality of devices structured to selectably connect and disconnect the DC power distribution system with the AC power bus and the DC power bus;

operating the controller to control the system in a first mode based upon evaluation of one or more first mode criteria, wherein the first mode powers the one or more AC loads with power from the AC power bus and powers the plurality of DC loads with power from the DC power bus;

operating the controller to control the system in a second mode based upon evaluation of one or more second mode criteria, wherein the second mode powers the one or more AC loads and the plurality of DC loads with power from the AC power bus; and operating the controller to control the system in a third mode based upon evaluation of one or more third mode criteria, wherein the third mode powers the one or more AC loads and the plurality of DC loads with power from the DC power bus wherein the one or more first mode criteria, the one or mode second mode criteria and the one or mode third mode criteria are selected to minimize consumption by the system of power from the utility grid while also providing substantially uninterrupted power to the one or more AC loads and the plurality of DC loads.

16. The method of claim 15 further comprising operating the controller to selectably connect and disconnect an energy storage system with the AC power bus or the DC power bus to supply power from the energy storage system to the AC power bus or the DC power bus, or to receive and store power at the energy storage system from the AC power bus or the DC power bus.

17. The method of claim 16 further comprising selectably operating the controller to supply power from the energy storage system to the AC power bus to offset a voltage drop associated with the AC power bus.

18. The method of claim 16 further comprising selectably operating the controller to supply power from the energy storage system to the DC power bus to offset a voltage drop associated with the DC power bus.

19. The method of claim 15 further comprising selectably operating the controller to supply power from one of the AC power bus and the DC power bus to the energy storage system based upon the energy storage capacity of the energy storage system.

\* \* \* \* \*